United States Patent [19]

Rieder et al.

[11] Patent Number: 4,584,773
[45] Date of Patent: Apr. 29, 1986

[54] LINEAR MEASURING SYSTEM

[75] Inventors: Heinz Rieder, St. Pantaleon; Max Schwaiger, Ostermiething, both of Austria

[73] Assignee: RSF Elektronik Gesellschaft M.B.H., Tarsdorf, Austria

[21] Appl. No.: 754,028

[22] Filed: Jul. 11, 1985

[30] Foreign Application Priority Data

Jul. 18, 1984 [AT] Austria .................................. 2317/84

[51] Int. Cl.$^4$ ............................................. G01B 11/04
[52] U.S. Cl. .................................. 33/125 C; 33/125 T; 250/237 G
[58] Field of Search ............ 33/125 R, 125 A, 125 C, 33/125 T, DIG. 19; 250/237 G; 356/395

[56] References Cited

U.S. PATENT DOCUMENTS

| 3,816,002 | 6/1974 | Wieg | 33/125 C |
| 4,060,903 | 12/1977 | Ernst | 33/125 C |
| 4,170,826 | 10/1979 | Holstein | 33/125 T |
| 4,320,578 | 3/1982 | Ernst | 33/125 T |
| 4,534,113 | 8/1985 | Holstein | 33/125 A |
| 4,541,181 | 9/1985 | Giacomello | 33/125 C |

Primary Examiner—Richard R. Stearns
Attorney, Agent, or Firm—Karl F. Ross; Herbert Dubno

[57] ABSTRACT

A linear measuring system comprises an elongate housing tube, which contains a metal strip, which is provided with a scale. The housing tube contains also a scanning unit, which is movable along the scanning tube to scan said scale. To ensure that the metal strip will be uniformly tensioned throughout its length and that the accuracy of the scanning operation will not be affected by a deviation of the longitudinal direction of the housing tube from a desired direction in which the measurement is to be taken or by changes of the length of the housing tube, the metal strip extends in the housing tube substantially without a longitudinal restraint and extends at both ends out of the housing tube and is held at said two ends by brackets, which are disconnected from the housing tube. In the housing tube, the side edges of the metal strip are entirely clear of the housing tube. The scanning unit is provided with guiding means, which are in sliding contact with both side edges of the metal strip and prevent a lateral wandering of the metal strip relative to the scanning unit.

5 Claims, 2 Drawing Figures

LINEAR MEASURING SYSTEM

BACKGROUND OF THE INVENTION

1. Field of the Invention

This invention relates to a linear measuring system comprising an elongate housing tube, which contains a metal strip provided with a scale, and a scanning unit, which is also accommodated in the housing tube and movable along the housing tube to scan the scale. Said strip is fixed at its ends and is tensioned by means of a spring, which acts on one end of the strip. Means are provided for adjusting the initial stress of said spring.

2. Description of the Prior Art

In such a measuring system the scale may comprise a multi-track coded scale for absolute measuring systems or an incremental scale for incremental measuring systems. In the latter case, one or more tracks provided with reference marks may extend beside the incremental scale. The scanning unit is adapted to scan the scale by optoelectronic, inductive, magnetic or capacitive mathods. In all cases, analog electric signals are obtained, which are optionally converted to digital signals and are processed and used for an indication of a result of the measurement or in a control system for a machine. The elongate housing tube is usually secured to a machine tool or in an industrial robot and the scanning unit is connected to a movable part, the displacement of which is to be measured, or vice versa. The elongate housing tube is in most cases slotted at its bottom and the scanning unit is movable along said tube by means of a sword, which extends out of the tube between sealing lips lining the slot.

In the known measuring systems of the present kind, as disclosed, e.g., in U.S. Pat. No. 3,816,002, the elongate housing tube is closed at its ends by covers and the scale-carrying strip is connected at its ends to said covers. One end of the scale-carrying strip is fixedly gripped by means of a clamp bracket. The other end of the scale-carrying strip is held in a slot formed in a bolt, which is adjustable in the longitudinal direction of the carrier tube by a screw. A spring is also provided, which tends to move the belt in a direction to tension the metal strip. The initial stress of the spring can be adjusted by means of the screw. In some known designs, the screw is accommodated in the elongate housing tube. Other known designs are provided with one or more tensioning screws, which are operable from the outside of the housing tube.

In order to facilitate the manufacture of the elongate housing tube, said tubes are almost always made of light metal, particularly aluminum, which has a much higher coefficient of expansion than the material of the machine bed to which the tube is secured. The change of the length of the tube in dependence on temperature results in changes of the tension of the metal strip so that the change of the length of the strip is larger than the change of the length of the strip which is due to its coefficient of expansion, which is lower than that of aluminum. Inherently, a steel strip would have approximately the same coefficient of expansion than the steel of which the machine bed is constructed. The changes in tension which are due to the differential thermal expansion and particularly to the large thermal expansion of the housing tube may result in errors in the scanning operation and in measuring errors, particularly in relatively long measuring systems.

In a known design, the metal strip is embedded in a groove of the elongate carrier and is secured in that groove by means of an elastically yielding adhesive or by other elastically yielding means. That arrangement comprises also tensioning means, but said tensioning means can be effective only in part and often cannot be effective throughout the length of the strip, particularly when the strip is relatively long. Above all, the adherence of the strip to the retaining means has the result that the tensile forces vary throughout the length of the strip so that its elongation varies too. Owing to the retaining means, the strip will follow any deviation of the housing tube from a straight line. In the described design, the scanning unit consists in most cases of a wheeled carriage, which is guided on the strip, which is supported in the described manner. The scanning operation may result in a change of the distance between the reading part of the scanning unit and the scale provided on the strip transeversely to the plane of the strip and in a displacement of said reading part in the plane of the strip, particularly toward the side edges of the strip. Said changes may result in signal changes and measuring errors. In consecutive scanning operations said displacements may be different at the same point of the scale so that even correcting means which may be provided to compensate said errors by the introduction of stored correcting signals will be ineffective at least in part.

SUMMARY OF THE INVENTION

It is an object of the invention to provide a linear measuring system which is of the kind described first hereinbefore and which is provided with simple means which ensure that the scanning operation will not be influenced by a temperature-dependent differential change of the length of the housing tube relative to the machine bed and by a deviation of the housing tube from a straight line.

That object is accomplished in accordance with the invention in that the tensioned metal strip extends in the housing tube substantially without longitudinal restraint, the side edges of the strip are entirely clear of the housing tube, both end portions of the strip extend out of the ends of the housing tube and are fixed to mounting brackets, which are disconnected from the housing tube and adapted to be separately mounted, and the scanning unit comprises guiding means in sliding contact with both side edges of the strip to prevent a lateral wandering of the strip relative to the scanning unit.

The measure adopted in accordance with the invention appears extremely simple in hindsight and has the result that the larger temperature-dependent changes of the length of the elongate housing tube can no longer result in changes of the length of the strip. Because the tensioned strip extends not by the housing tube, a deviation of the housing tube from a straight line will not affect the linearity of the strip. The strip is under the same tensile stress at any point of its length. During the scanning operation a fixed position of the scanning unit and of the strip relative to each other is maintained in directions which are transverse to the longitudinal direction of the strip, both in the plane of the strip and normal to said plane. This will increase the accuracy of the scanning operation and will ensure a generation of signals which are more uniform than in the known arrangement. The ends of the strip are easily accessible and simple tensioning means are obtained.

In accordance with a preferred feature of the invention, one end of the strip is connected to the associated mounting bracket by an adjusting mechanism and the other end of the strip is connected to the associated mounting bracket by means of a spring.

DETAILED DESCRIPTION OF THE PREFERRED EMBODIMENT

Figure 1:
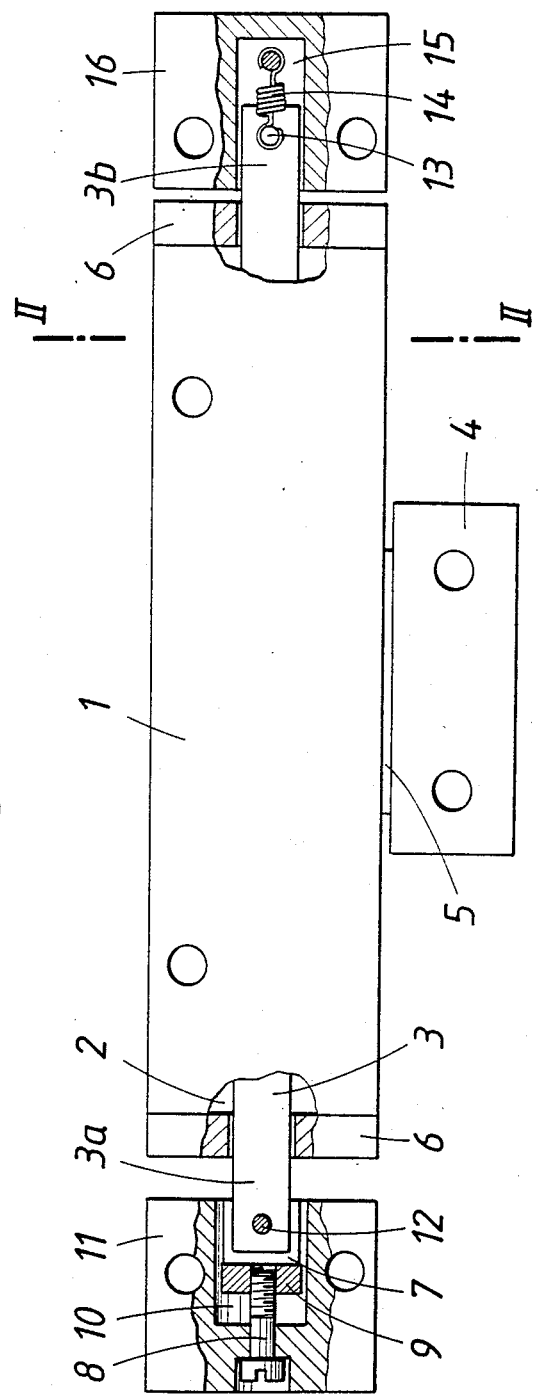
FIG. 1 is an elevation showing partly in section a measuring system embodying the invention.

An illustrative embodiment of the invention is shown on the drawing.

The measuring system comprises an elongate housing tube 1, which extends throughout the range in which a measurement is to be taken but has been shown only in part of its length on the drawing. The housing tube 1 defines an internal cavity 2, which is accessible through a slot formed in the bottom of the tube 1. That slot may be lined with sealing lips. A metal strip 3 provided with a scale extends in the cavity 2 and is adapted to be scanned by means of a scanning unit 17 for generating analog signals in dependence on the scanning of the scale. The scanning unit 17 is represented only by its contours and is movable along the tube 1 by means of a sword 5, which extends out of the cavity 2 through the slot of the tube and is connected by a bracket 4 to a tool slide.

The elongate housing tube 1 is closed at its ends by covers 6, each of which is formed with a slot. The end portions 3a, 3b of the metal strip extend out of the tube 1 through the slots in the covers 6. The strip end portion 3a extends into a slot 7 formed in a tensioning member 9, which is adjustable by a screw 8 in a bore 10 of a bracket 11. In the slot 7, the strip end portion 3a is pivoted to the tensioning member 9 by means of a pivot 12, which extends transversely to the plane of the strip 3.

The strip end portion 3b is provided with a crosspin 13, which is connected to a tension spring 14, which extends into a bore 15 of a mounting bracket 16, to which the spring 14 is secured and which is adapted to be separately mounted.

The brackets 11 and 16 are disconnected from the housing tube 1.

Figure 2:
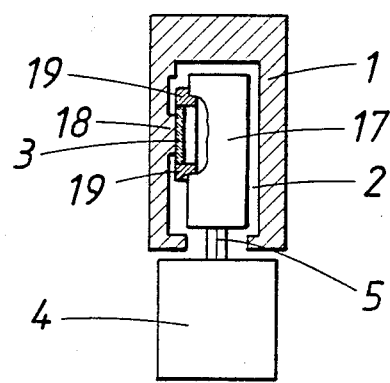
FIG. 2 is a sectional view taken on line II—II in FIG. 1.

As is particularly apparent from FIG. 2, the tensioned metal strip 3 is substantially unrestrained in its longitudinal direction between the connecting elements 13 and 12. On the side which is opposite to the scanning unit 17, the strip 3 is in sliding contact with a rib 18 provided on the inside surface of the housing tube 1. The scanning unit 17 carries guide bars 19, which consist, e.g., of low-friction plastic elements and are in sliding contact with both side edges of the metal strip 3, in order to prevent a lateral wandering of the metal strip 3 relative to the scanning unit 17. The scanning unit 17 may be provided with additional low-friction elements for guiding a scanning plate or another scanning element of the scanning unit on that side of the strip 3 which is provided with the scale.

I claim:

1. In a linear measuring system comprising
   an elongate housing tube,
   a metal strip extending in said housing tube along the same and provided with a longitudinal scale and having mutually opposite side edges extending in said housing tube,
   a scanning unit extending in and movable along said housing tube to scan said scale, and
   strip-mounting means for mounting said metal strip at both ends thereof, said strip-mounting means comprising a spring connected to one end of said metal strip and tensioning said strip, and an adjusting mechanism for adjusting the initial tension of said spring,
   the improvement residing in that
   said strip extends in said housing tube substantially without a longitudinal restraint,
   said side edges are entirely clear of said housing tube,
   said strip-mounting means comprise two brackets, which extend outside said housing tube and are disconnected from said housing tube and are connected to said metal strip at respective ends thereof, and
   said scanning unit comprises guiding means in sliding contact with both said side edges of said metal strip to prevent a lateral wandering of said metal strip relative to said scanning unit.

2. The improvement set forth in claim 1, wherein
   said strip extends at both ends out of said housing tube and
   said brackets are entirely disposed outside said housing tube.

3. The improvement set forth in claim 1, wherein said strip is connected at one end thereof by said spring to one of said brackets.

4. The improvement set forth in claim 1, wherein said strip is connected at one end thereof by said adjusting mechanism to one of said brackets.

5. The improvement set forth in claim 1, wherein
   said metal strip is connected at one end thereof by said spring to one of said brackets and
   said metal strip is connected at the other end thereof by said adjusting mechanism to the other of said brackets.

* * * * *